Feb. 20, 1934.  W. A. INGLER  1,947,526

METHOD OF MAKING A GLASS ARTICLE

Filed May 21, 1932

INVENTOR.
William A. Ingler
BY Jacob Lieberman
ATTORNEY.

Patented Feb. 20, 1934

1,947,526

UNITED STATES PATENT OFFICE 1,947,526

METHOD OF MAKING A GLASS ARTICLE

William A. Ingler, Newark, Ohio, assignor to Holophane Company, Inc., New York, N. Y., a corporation of Delaware Application May 21, 1932. Serial No. 612,691

2 Claims. (Cl. 49—79)

The present invention relates to improvements in the art of annealing, and is more particularly directed toward the lehr process of annealing pressed glass articles having "knockouts".

The following manufacturing routine is described for the purpose of giving the background necessary for a better understanding of the invention.

Pressed glass is formed from molten melt in a press having a stationary machined metal mold and movable machined metal plunger. Articles, which in their final form are true or modified hollow cylinders, hollow spherical segments, hollow paraboloidal segments, and the like, are pressed, for mechanical reasons, with the smaller bases closed by knock out areas. In the finishing process, these knock out areas are weakened by scratching the surfaces and removed by a quick blow.

Shop practice, in a limited sense, consists of two consecutive operations; pressing and annealing.

In pressing, the article takes its final form by forcing a plunger into a mold containing the requisite volume of molten glass. The mold and plunger are preheated for the operation; nevertheless, there is a wide variation between the temperatures of the glass and the mold surfaces which causes a more rapid setting of the glass in some regions than in others. This action sets up strains in the internal structure of the material, becoming more aggravated as the glass cools. Should the article be allowed to cool to room temperature in open air, these internal glass stresses would become so severe that the slightest movement might cause the article to fly into pieces.

Annealing is the process that removes the strains set up in pressing. While the article is still hot from the press it is removed to the lehr. This machine is an extended oven in which the temperatures are controlled from high values at the entrance to practically room temperature at the exit. The floor of the lehr is composed of moving "pans" (operating either on the power driven endless belt principle or manually powered train principle) progressing slowly toward the region of lower temperature. When the article is placed in the lehr, the knockout is downward in contact with the "pan". It then moves slowly through the lehr, being first brought up to a temperature sufficiently high to produce a state of plasticity which removes the pressing strains, after which gradual cooling takes place and the article becomes permanently set. Perfect annealing, that is, the complete removal of strains, can be accomplished only when the lehr heating and cooling is gradual and uniform throughout the whole glass structure. In practice, it has been found that flat knockout areas in contact with the "pan" have a tendency to cool more rapidly than the areas exposed to the heated air in the lehr because the pans are metallic and conduct heat away from the area in physical contact faster than the air surrounding the remaining area. This results in uneven annealing extending partially into the final structure after the knockout has been removed.

The present invention contemplates the addition of hemispherical pits equally spaced in the face of the mold where the knockout occurs. In pressing, these pits admit the glass thus forming a studded instead of flat surface to the knockout in the pressed piece. When the article is placed in the lehr for annealing, these studs raise the entire knockout surface from the pan, thereby permitting a free circulation of heated air under the piece yet with a negligible amount of surface in actual contact with the pan.

The accompanying drawing shows, for the purpose of illustrating the invention, one of the many possible embodiments in which the present invention may take form, it being understood that the drawing is illustrative of the invention rather than limiting the same. In the drawing.

Figure 1:
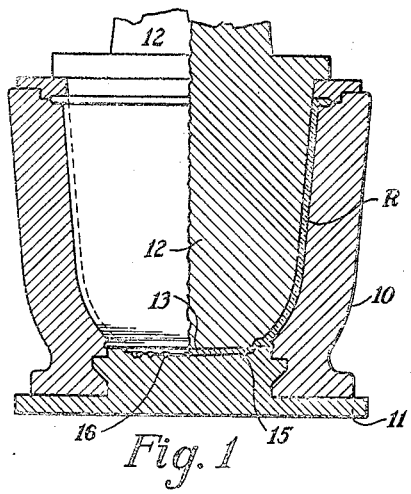
Fig. 1 is a sectional view through a mold with pressed article and plunger.
Figure 2:
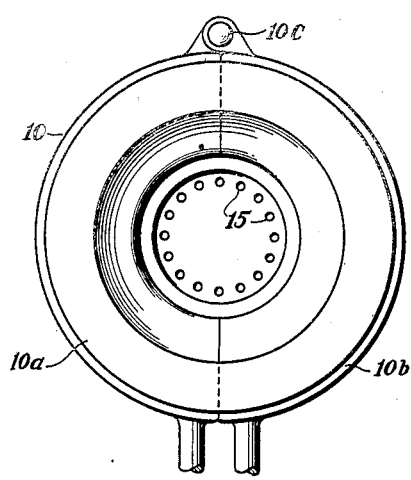
Fig. 2 is a top plan view of the mold.

The mold 10 may be of the type made in two halves, 10a and 10b, hinged together at 10c and provided with a suitable bottom 11 and clamping devices, not shown. The invention, however, is not limited to the manufacture of glass articles of the type requiring split molds. The inner surface of the mold is made of such shape as to produce an article having the desired exterior. The plunger 12 is of desired shape to produce the article having walls of the desired inner configuration and has a bottom face 13 adapted to be brought close to the bottom of the mold. The walls may be smooth or otherwise shaped so long as not to interfere with the withdrawal of the plunger.

The mold and plunger shown in the drawing are of a shape such as would be employed in making a refractor for street lighting work. This refractor R may have external prisms indicated at 14.

Figure 3:
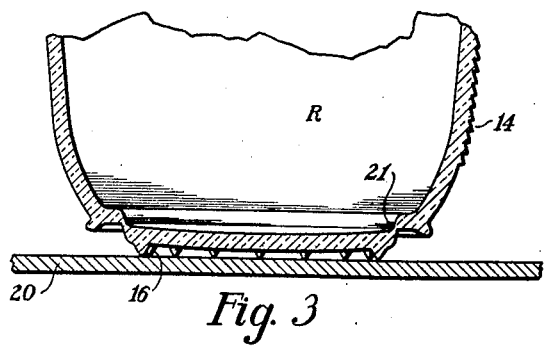
Fig 3 is a fragmentary enlarged sectional view through the freshly pressed article such as a refractor.

The bottom 11 of the mold is provided with a number of pits or depressions at 15 which may be spaced in any desired manner. The bottoms of these depressions or pits are at the same elevation. During the pressing operation the glass enters these depressions or pits and forms projections indicated at 16 in Fig. 3.

When the freshly pressed article is removed from the mold in the regular manner, it is deposited on the lehr plate, indicated at 20, the projections 16 being in contact with this lehr plate and holding the bottom of the article out of contact with the lehr plate. This permits the circulation of air between the glass and the lehr plate and retards the transmission of heat from the glass to the lehr plate.

Figure 4:
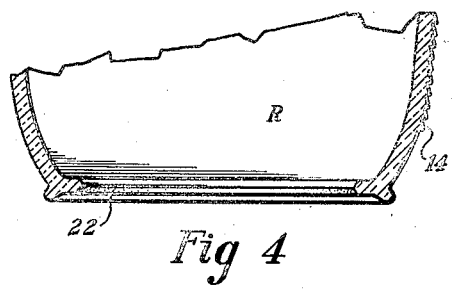
Fig. 4 is a fragmentary sectional view through the finished article.

After the annealing has been completed, the bottom portion is removed in any desired manner, for example by scratching the glass at the point marked 21 and breaking away the thin bottom which bears the projections. The surface of the glass is then ground as indicated at 22 in Fig. 4.

What is claimed is:

1. The method of making pressed glass articles, which comprises pressing an article with a bottom having a plurality of small projections depending therefrom, placing the article on a lehr pan so that the body of the pressed article is held out of contact with the pan by the projections, whereby circulation of gases about the bottom is promoted and heat conduction from the body of the article is retarded, annealing the glass, and breaking away the bottom with projections to have the finished article without any bottom.

2. The method of making refractors which comprises pressing glass to form a bowl shaped article having thick prismatic walls and a thin bottom having a plurality of small projections depending therefrom, passing said article through a lehr, the projections supporting it above the plate of the lehr, whereby circulation of gases about the bottom is promoted and heat conduction from the body of the article is retarded, annealing the glass, and breaking away said bottom to leave an annular refractor open at both ends.

WILLIAM A. INGLER.